(12) United States Patent
Kim et al.

(10) Patent No.: US 10,402,978 B1
(45) Date of Patent: Sep. 3, 2019

(54) METHOD FOR DETECTING PSEUDO-3D BOUNDING BOX BASED ON CNN CAPABLE OF CONVERTING MODES ACCORDING TO POSES OF OBJECTS USING INSTANCE SEGMENTATION AND DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/258,156

(22) Filed: Jan. 25, 2019

(51) Int. Cl.
 *G06K 9/00* (2006.01)
 *G06T 7/11* (2017.01)
 (Continued)

(52) U.S. Cl.
 CPC .............. *G06T 7/11* (2017.01); *G06K 9/6232* (2013.01); *G06K 9/6262* (2013.01);
 (Continued)

(58) Field of Classification Search
 CPC .. G06K 9/6267; G06K 9/6232; G06K 9/6262; G06T 7/246; G06T 7/11; G06T 7/73; G06T 2207/20081; G06T 2207/20084; G06T 15/10; G06T 19/006; G06F 17/11; G06N 3/0454
 See application file for complete search history.

(56) References Cited

U.S. PATENT DOCUMENTS

2018/0260651 A1* 9/2018 Wang ................... G06K 9/3241
2018/0268292 A1* 9/2018 Choi ....................... G06N 3/08

* cited by examiner

*Primary Examiner* — Shefali D Goradia
(74) *Attorney, Agent, or Firm* — Kaplan Breyer Schwarz, LLP

(57) ABSTRACT

A method for detecting a pseudo-3D bounding box based on a CNN capable of converting modes according to poses of detected objects using an instance segmentation is provided to be used for realistic rendering in virtual driving. Shade information of each of surfaces of the pseudo-3D bounding box can be reflected on the learning according to this method. The pseudo-3D bounding box may be obtained through a lidar or a rader, and the surface may be segmented by using a camera. The method includes steps of: a learning device instructing a pooling layer to apply pooling operations to a 2D bounding box region, thereby generating a pooled feature map, and instructing an FC layer to apply neural network operations thereto; instructing a convolutional layer to apply convolution operations to surface regions; and instructing a FC loss layer to generate class losses and regression losses.

30 Claims, 8 Drawing Sheets

(51) Int. Cl.
*G06T 7/73* (2017.01)
*G06K 9/62* (2006.01)
(52) U.S. Cl.
CPC .............. *G06K 9/6267* (2013.01); *G06T 7/73* (2017.01); *G06T 2207/20081* (2013.01); *G06T 2207/20084* (2013.01)

US 10,402,978 B1

METHOD FOR DETECTING PSEUDO-3D BOUNDING BOX BASED ON CNN CAPABLE OF CONVERTING MODES ACCORDING TO POSES OF OBJECTS USING INSTANCE SEGMENTATION AND DEVICE USING THE SAME

FIELD OF THE DISCLOSURE

The present disclosure relates to a learning method, a learning device, a testing method and a testing device for use with an autonomous vehicle; and more particularly, to the learning method and the learning device for detecting at least one pseudo-3D bounding box based on a CNN, and the testing method and the testing device using the same.

BACKGROUND OF THE DISCLOSURE

An autonomous car is a vehicle that is capable of sensing its environment and navigating without human input. Autonomous cars use a variety of techniques to detect their surroundings, such as radar, laser light, GPS, odometry, and computer vision.

Estimating three-dimensional (3D) information from two-dimensional (2D) monocular images by using the computer vision is an important task in applications such as autonomous driving and personal robotics. In general, a 2D box for bounding an object in an image is created and then a 3D model is constructed from the 2D box.

To find the 2D box for bounding an object, conventional technologies used template-based method in general. One of the conventional methods for creating the 2D box is a sliding windows method. The method slides a window-like box repeatedly over a whole image with varying scales and detects each object inside the window-like box. That is, as the objects in the image can be of very different sizes or scales, the image is scaled down several times and the window-like box is slid over the image again to find the objects at different sizes.

One of other conventional methods is an anchor box method. In this method, various anchor boxes are centered at a certain position and an anchor box with the highest probability, e.g., the highest overlapping region with a ground truth object, among the various anchor boxes, is determined by using regression analysis.

Then, a 3D bounding box is constructed from the determined anchor box, however, there are limitations. First, the 3D bounding box may have six surfaces and three surfaces among the six surfaces may require exhaustive searches. Second, in case a single template is used for determining the three surfaces of the 3D bounding box, an accuracy may be low because boundary conditions of regression may vary as 3D orientation of the object changes. Third, conventional methods of acquiring the 3D bounding box require much computational resources. For example, matching a cuboid template or voxel for finding a 3D bounding box takes up a lot of computational time.

Thus, the present disclosure proposes a new method for removing such redundant computation and improving the accuracy of detection.

SUMMARY OF THE DISCLOSURE

It is an object of the present disclosure to solve all the aforementioned problems.

It is another object of the present disclosure to simplify a 3D bounding box for circumscribing a 3D object by using a pseudo-3D box.

It is still another object of the present disclosure to reduce computational time and resources by using 2D coordinates of vertices of the pseudo-3D box.

In accordance with one aspect of the present disclosure, there is provided a method for detecting at least one pseudo-3D bounding box based on a CNN using an instance segmentation, including steps of: (a) a learning device, if at least one input feature map and at least one 2D bounding box are acquired, wherein the input feature map is generated from one or more convolution operations on at least one training image, and wherein the 2D bounding box includes at least one object on the training image, instructing a pooling layer to apply a pooling operation to at least one region, corresponding to the 2D bounding box, on the input feature map, to thereby generate a pooled feature map, and instructing an FC layer to apply at least one neural network operation to the pooled feature map, to thereby generate box pattern information corresponding to the pseudo-3D bounding box; (b) the learning device (i) instructing a classification layer to generate class information corresponding to an orientation of the object by referring to the box pattern information, (ii) instructing a regression layer to generate regression information on coordinates of the pseudo-3D bounding box corresponding to coordinates of the 2D bounding box by referring to the box pattern information, and (iii) instructing a convolutional layer to apply convolution operations to each region corresponding to each surface, generated by referring to the regression information, of the pseudo-3D bounding box on the pooled feature map, to thereby generate one or more instance feature maps, and instructing a mask layer to generate each mask corresponding to said each surface by referring to the instance feature maps and the class information; and (c) the learning device instructing at least one FC loss layer to generate each class loss and each regression loss by referring to the class information and the regression information and their corresponding one or more GTs, to thereby learn parameters of the FC layer by backpropagating the class loss and the regression loss.

As one example, after the step of (b), the learning device instructs at least one mask loss layer to generate at least one mask loss by referring to said each mask and its corresponding mask GT, to thereby adjust at least part of parameters of the mask layer and the convolutional layer by backpropagating the mask loss.

As one example, the mask layer includes at least part of a fully convolution network.

As one example, wherein the mask is a binary mask which distinguishes between at least one pixel where the object is determined as located and at least one pixel where the object is determined as not located, on each of the instance feature maps.

As one example, at the step of (b), the learning device instructs the regression layer to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

As one example, supposing that each of diagonal vertices of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box, the learning device (i) connects vertices of the first and the second instance bounding boxes, which are located on a first pair of two adjacent lines of the 2D bounding box, and connects vertices of the first and the second instance bounding boxes, which are located on a second pair of other two adjacent lines of the 2D bounding box, wherein the two adjacent lines in each of the first and the second pairs do not meet at any of said each of diagonal vertices and (ii) connects the first vertex and a vertex of the second instance bounding box which is not located on any line of the 2D bounding box, connects the second vertex and a vertex of the first instance bounding box which is not located on any line of the 2D bounding box, and then generates the pseudo-3D bounding box by referring to the class information.

As one example, the learning device acquires the input feature map and the 2D bounding box from an object detector based on a CNN.

As one example, the object detector instructs at least one preceding convolutional layer to generate at least one preceding feature map by the convolution operations on the training image, instructing at least one preceding RPN to generate at least one preceding proposal box corresponding to at least one object for training in the training image, from the preceding feature map, instructing at least one preceding pooling layer to apply the pooling operation to at least one region, corresponding to the preceding proposal box, on the preceding feature map, to thereby generate at least one preceding pooled feature map, instructing at least one preceding FC layer to apply at least one neural network operation to the preceding pooled feature map, to thereby generate preceding object pattern information corresponding to the object for training, instructing at least one preceding classification layer to generate preceding class information of the object for training by referring to the preceding object pattern information, and instructing at least one preceding regression layer to generate preceding regression information on the 2D bounding box corresponding to the object for training by referring to the preceding object pattern information, to thereby generate the input feature map and the 2D bounding box.

In accordance with another aspect of the present disclosure, there is provided a testing method for detecting at least one pseudo-3D bounding box based on a CNN using an instance segmentation, including steps of: (a) a testing device, on condition that a learning device (i) has acquired at least one input feature map for training and at least one 2D bounding box for training, wherein the input feature map for training is generated from one or more convolution operations on at least one training image, and wherein the 2D bounding box for training includes at least one object for training in the training image, (ii) has instructed at least one pooling layer to apply at least one pooling operation to at least one region, corresponding to the 2D bounding box for training, on the input feature map for training, to thereby generate at least one pooled feature map for training, (iii) has instructed at least one FC layer to apply at least one neural network operation to the pooled feature map for training, to thereby generate box pattern information for training corresponding to the pseudo-3D bounding box, (iv) has instructed at least one classification layer to generate class information for training corresponding to an orientation of the object for training by referring to the box pattern information for training, (v) has instructed at least one regression layer to generate regression information for training on coordinates of the pseudo-3D bounding box corresponding to coordinates of the 2D bounding box for training by referring to the box pattern information for training, (vi) has instructed at least one convolutional layer to apply the convolution operations to each region corresponding to each surface, generated by referring to the regression information for training, of the pseudo-3D bounding box on the pooled feature map for training, to thereby generate one or more instance feature maps for training, (vii) has instructed at least one mask layer to generate each mask for training corresponding to said each surface by referring to the instance feature maps for training and the class information for training, and (viii) has instructed at least one FC loss layer to generate each class loss and each regression loss by referring to the class information for training and the regression information for training and their corresponding one or more GTs, to thereby learn parameters of the FC layer by backpropagating the class loss and the regression loss, instructing the pooling layer to apply the pooling operation to at least one region corresponding to at least one 2D bounding box for testing on at least one input feature map for testing, to thereby generate at least one pooled feature map for testing, and instructing the FC layer to apply the neural network operation to the pooled feature map for testing, to thereby generate box pattern information for testing corresponding to the pseudo-3D bounding box; and (b) the testing device (i) instructing the classification layer to generate class information for testing corresponding to an orientation of at least one object for testing by referring to the box pattern information for testing, (ii) instructing the regression layer to generate regression information for testing on coordinates of the pseudo-3D bounding box corresponding to coordinates of the 2D bounding box for testing by referring to the box pattern information for testing, and (iii) instructing the convolutional layer to apply the convolution operations to each region corresponding to each surface, generated by referring to the regression information for testing, of the pseudo-3D bounding box on the pooled feature map for testing, to thereby generate one or more instance feature maps for testing, and instructing the mask layer to generate each mask for testing corresponding to said each surface by referring to the instance feature maps for testing and the class information for testing.

As one example, after the process of (vii), the learning device has instructed at least one mask loss layer to generate at least one mask loss by referring to said each mask for training and its corresponding mask GT, to thereby adjust at least part of parameters of the mask layer and the convolutional layer by backpropagating the mask loss.

As one example, wherein said each mask for testing is a binary mask which distinguishes between at least one pixel where the object for testing is determined as located and at least one pixel where the object for testing is determined as not located, on each of the instance feature maps for testing.

As one example, at the step of (b), the testing device instructs the regression layer to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

As one example, supposing that each of diagonal vertices of the 2D bounding box for testing is a first vertex and a second vertex, that an instance bounding box for testing whose at least one vertex matches the first vertex among the instance bounding boxes for testing is a first instance bounding box for testing, and that an instance bounding box for testing whose at least one vertex matches the second vertex among the instance bounding boxes for testing is a second instance bounding box for testing, the testing device (i) connects vertices of the first and the second instance bounding boxes for testing, which are located on a first pair of two adjacent lines of the 2D bounding box for testing, and connects vertices of the first and the second instance bounding boxes for testing, which are located on a second pair of other two adjacent lines of the 2D bounding box for testing, wherein the two adjacent lines in each of the first and the second pairs do not meet at any of said each of diagonal vertices and (ii) connects the first vertex and a vertex of the second instance bounding box for testing which is not located on any line of the 2D bounding box for testing, connects the second vertex and a vertex of the first instance bounding box for testing which is not located on any line of the 2D bounding box for testing, and then generates the pseudo-3D bounding box by referring to the class information.

As one example, the testing device acquires the input feature map for testing and the 2D bounding box for testing from an object detector based on a CNN.

As one example, the object detector instructs at least one preceding convolutional layer to generate at least one preceding feature map for testing by the convolution operations on the test image, instructs at least one preceding RPN to generate at least one preceding proposal box for testing corresponding to the object for testing in the test image, from the preceding feature map for testing, instructs at least one preceding pooling layer to apply the pooling operation to at least one region, corresponding to the preceding proposal box for testing, on the preceding feature map for testing, to thereby generate at least one preceding pooled feature map for testing, instructs at least one preceding FC layer to apply the neural network operation to the preceding pooled feature map for testing, to thereby generate preceding object pattern information for testing corresponding to the object for testing, instructs at least one preceding classification layer to generate preceding class information for testing of the object for testing by referring to the preceding object pattern information for testing, and instructs at least one preceding regression layer to generate preceding regression information for testing on the 2D bounding box for testing corresponding to the object for testing by referring to the preceding object pattern information for testing, to thereby generate the input feature map for testing and the 2D bounding box for testing.

In accordance with still another aspect of the present disclosure, there is provided a learning device for detecting at least one pseudo-3D bounding box based on a CNN using an instance segmentation, including: at least one memory that stores instructions; and a processor configured to execute the instructions to: perform processes of (I) instructing a pooling layer to apply a pooling operation to at least one region, corresponding to at least one 2D bounding box, on at least one input feature map, to thereby generate a pooled feature map, and instructing an FC layer to apply at least one neural network operation to the pooled feature map, to thereby generate box pattern information corresponding to the pseudo-3D bounding box, wherein the input feature map is generated from one or more convolution operations on at least one training image, and wherein the 2D bounding box includes at least one object on the training image, (II) (II-1) instructing a classification layer to generate class information corresponding to an orientation of the object by referring to the box pattern information, (II-2) instructing a regression layer to generate regression information on coordinates of the pseudo-3D bounding box corresponding to coordinates of the 2D bounding box by referring to the box pattern information, and (II-3) instructing a convolutional layer to apply convolution operations to each region corresponding to each surface, generated by referring to the regression information, of the pseudo-3D bounding box on the pooled feature map, to thereby generate one or more instance feature maps, and instructing a mask layer to generate each mask corresponding to said each surface by referring to the instance feature maps and the class information; and (III) instructing at least one FC loss layer to generate each class loss and each regression loss by referring to the class information and the regression information and their corresponding one or more GTs, to thereby learn parameters of the FC layer by backpropagating the class loss and the regression loss.

As one example, after the process of (II-3), the processor instructs at least one mask loss layer to generate at least one mask loss by referring to said each mask and its corresponding mask GT, to thereby adjust at least part of parameters of the mask layer and the convolutional layer by backpropagating the mask loss.

As one example, the mask layer includes at least part of a fully convolution network.

As one example, the mask is a binary mask which distinguishes between at least one pixel where the object is determined as located and at least one pixel where the object is determined as not located, on each of the instance feature maps.

As one example, at the process of (II-3), the processor instructs the regression layer to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

As one example, supposing that each of diagonal vertices of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box, the processor (i) connects vertices of the first and the second instance bounding boxes, which are located on a first pair of two adjacent lines of the 2D bounding box, and connects vertices of the first and the second instance bounding boxes, which are located on a second pair of other two adjacent lines of the 2D bounding box, wherein the two adjacent lines in each of the first and the second pairs do not meet at any of said each of diagonal vertices and (ii) connects the first vertex and a vertex of the second instance bounding box which is not located on any line of the 2D bounding box, connects the second vertex and a vertex of the first instance bounding box which is not located on any line of the 2D bounding box, and then generates the pseudo-3D bounding box by referring to the class information.

As one example, the processor acquires the input feature map and the 2D bounding box from an object detector based on a CNN.

As one example, the object detector instructs at least one preceding convolutional layer to generate at least one preceding feature map by the convolution operations on the training image, instructing at least one preceding RPN to generate at least one preceding proposal box corresponding to at least one object for training in the training image, from the preceding feature map, instructing at least one preceding pooling layer to apply the pooling operation to at least one region, corresponding to the preceding proposal box, on the preceding feature map, to thereby generate at least one preceding pooled feature map, instructing at least one preceding FC layer to apply at least one neural network operation to the preceding pooled feature map, to thereby generate preceding object pattern information corresponding to the object for training, instructing at least one preceding classification layer to generate preceding class information of the object for training by referring to the preceding object pattern information, and instructing at least one preceding regression layer to generate preceding regression information on the 2D bounding box corresponding to the object for training by referring to the preceding object pattern information, to thereby generate the input feature map and the 2D bounding box.

In accordance with still yet another aspect of the present disclosure, there is provided a testing device for detecting at least one pseudo-3D bounding box based on a CNN using an instance segmentation, including: at least one memory that stores instructions; and at least one processor, on condition that a learning device (i) has acquired at least one input feature map for training and at least one 2D bounding box for training, wherein the input feature map for training is generated from one or more convolution operations on at least one training image, and wherein the 2D bounding box for training includes at least one object for training in the training image, (ii) has instructed at least one pooling layer to apply at least one pooling operation to at least one region, corresponding to the 2D bounding box for training, on the input feature map for training, to thereby generate at least one pooled feature map for training, (iii) has instructed at least one FC layer to apply at least one neural network operation to the pooled feature map for training, to thereby generate box pattern information for training corresponding to the pseudo-3D bounding box, (iv) has instructed at least one classification layer to generate class information for training corresponding to an orientation of the object for training by referring to the box pattern information for training, (v) has instructed at least one regression layer to generate regression information for training on coordinates of the pseudo-3D bounding box corresponding to coordinates of the 2D bounding box for training by referring to the box pattern information for training, (vi) has instructed at least one convolutional layer to apply the convolution operations to each region corresponding to each surface, generated by referring to the regression information for training, of the pseudo-3D bounding box on the pooled feature map for training, to thereby generate one or more instance feature maps for training, (vii) has instructed at least one mask layer to generate each mask for training corresponding to said each surface by referring to the instance feature maps for training and the class information for training, and (viii) has instructed at least one FC loss layer to generate each class loss and each regression loss by referring to the class information for training and the regression information for training and their corresponding one or more GTs, to thereby learn parameters of the FC layer by backpropagating the class loss and the regression loss; configured to execute the instructions to: perform processes of (I) instructing the pooling layer to apply the pooling operation to at least one region corresponding to at least one 2D bounding box for testing on at least one input feature map for testing, to thereby generate at least one pooled feature map for testing, wherein the input feature map for testing is generated from one or more convolution operations on at least one test image, and wherein the 2D bounding box for testing includes at least one object for testing on the test image, and instructing the FC layer to apply the neural network operation to the pooled feature map for testing, to thereby generate box pattern information for testing corresponding to the pseudo-3D bounding box, (II) (II-1) instructing the classification layer to generate class information for testing corresponding to an orientation of the object for testing by referring to the box pattern information for testing, (II-2) instructing the regression layer to generate regression information for testing on coordinates of the pseudo-3D bounding box corresponding to coordinates of the 2D bounding box for testing by referring to the box pattern information for testing, and (II-3) instructing the convolutional layer to apply the convolution operations to each region corresponding to each surface, generated by referring to the regression information for testing, of the pseudo-3D bounding box on the pooled feature map for testing, to thereby generate one or more instance feature maps for testing, and instructing the mask layer to generate each mask for testing corresponding to said each surface by referring to the instance feature maps for testing and the class information for testing.

As one example, after the process of (vii), the learning device has instructed at least one mask loss layer to generate at least one mask loss by referring to said each mask for training and its corresponding mask GT, to thereby adjust at least part of parameters of the mask layer and the convolutional layer by backpropagating the mask loss.

As one example, said each mask for testing is a binary mask which distinguishes between at least one pixel where the object for testing is determined as located and at least one pixel where the object for testing is determined as not located, on each of the instance feature maps for testing.

As one example, at the process of (II-2), the processor instructs the regression layer to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

As one example, supposing that each of diagonal vertices of the 2D bounding box for testing is a first vertex and a second vertex, that an instance bounding box for testing whose at least one vertex matches the first vertex among the instance bounding boxes for testing is a first instance bounding box for testing, and that an instance bounding box for testing whose at least one vertex matches the second vertex among the instance bounding boxes for testing is a second instance bounding box for testing, the processor (i) connects vertices of the first and the second instance bounding boxes for testing, which are located on a first pair of two adjacent lines of the 2D bounding box for testing, and connects vertices of the first and the second instance bounding boxes for testing, which are located on a second pair of other two adjacent lines of the 2D bounding box for testing, wherein the two adjacent lines in each of the first and the second pairs do not meet at any of said each of diagonal vertices and (ii) connects the first vertex and a vertex of the second instance bounding box for testing which is not located on any line of the 2D bounding box for testing, connects the second vertex and a vertex of the first instance bounding box for testing which is not located on any line of the 2D bounding box for testing, and then generates the pseudo-3D bounding box by referring to the class information.

As one example, wherein the processor acquires the input feature map for testing and the 2D bounding box for testing from an object detector based on a CNN.

As one example, the object detector instructs at least one preceding convolutional layer to generate at least one preceding feature map for testing by the convolution operations on the test image, instructs at least one preceding RPN to generate at least one preceding proposal box for testing corresponding to the object for testing in the test image, from the preceding feature map for testing, instructs at least one preceding pooling layer to apply the pooling operation to at least one region, corresponding to the preceding proposal box for testing, on the preceding feature map for testing, to thereby generate at least one preceding pooled feature map for testing, instructs at least one preceding FC layer to apply the neural network operation to the preceding pooled feature map for testing, to thereby generate preceding object pattern information for testing corresponding to the object for testing, instructs at least one preceding classification layer to generate preceding class information for testing of the object for testing by referring to the preceding object pattern information for testing, and instructs at least one preceding regression layer to generate preceding regression information for testing on the 2D bounding box for testing corresponding to the object for testing by referring to the preceding object pattern information for testing, to thereby generate the input feature map for testing and the 2D bounding box for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
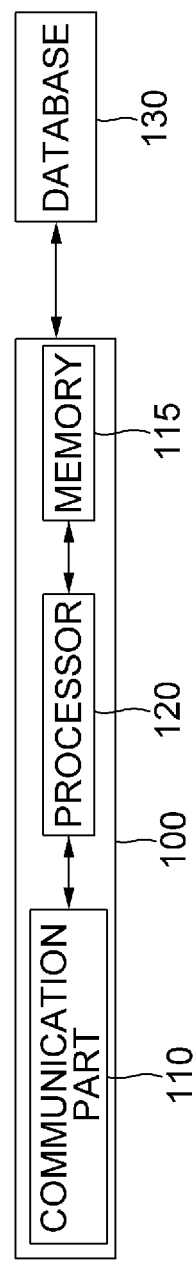
FIG. 1 is a drawing schematically illustrating a learning device for detecting a pseudo-3D bounding box based on a CNN using an instance segmentation in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for detecting at least one pseudo-3D bounding box based on a CNN using an instance segmentation in accordance with one example embodiment of the present disclosure, and by referring to FIG. 1, the learning device 100 may include a communication part 110 and a processor 120. In addition, the learning device may further include a memory 115 capable of storing computer readable instructions for performing following processes. As one example, the processor, the memory, a medium, etc. may be integrated with an integrated processor.

First, the communication part 110 may acquire at least one input feature map and at least one 2D bounding box. Herein, the input feature map is generated from one or more convolution operations on at least one training image, and the 2D bounding box circumscribes at least one object on the training image.

Herein, the communication part 110 may acquire or support another device to acquire information on the input feature map and the 2D bounding box from a database 130, or from an object detector based on a CNN by inputting the training image stored in the database 130 into the object detector. A process of generating the input feature map and the 2D bounding box by using the object detector is described later. Additionally, the database 130 may store at least one ground truth of location information on the pseudo-3D bounding box and class information on orientation of the object corresponding to the 2D bounding box. Additionally, the database 130 may store one or more ground truths corresponding to location information on the 2D bounding box and one or more ground truths corresponding to an object class, of the object on the training image.

Next, the processor 120 may instruct at least one pooling layer to apply at least one pooling operation to at least one region, corresponding to the 2D bounding box, on the input feature map, to thereby generate at least one pooled feature map, and may instruct at least one FC layer to apply at least one neural network operation to the pooled feature map, to thereby generate box pattern information corresponding to the pseudo-3D bounding box. Then, the processor 120 may (i) instruct at least one classification layer to generate class information corresponding to an orientation of the object by referring to the box pattern information, (ii) instruct at least one regression layer to generate regression information on coordinates of the pseudo-3D bounding box corresponding to coordinates of the 2D bounding box by referring to the box pattern information, and (iii) instruct at least one convolutional layer to apply the convolution operations to each region corresponding to each surface, generated by referring to the regression information, i.e., information on the coordinates of the pseudo-3D bounding box, of the pseudo-3D bounding box on the pooled feature map, to thereby generate one or more instance feature maps, and instruct at least one mask layer to generate each mask corresponding to said each surface by referring to the instance feature maps and the class information. Thereafter, the processor 120 may instruct at least one FC loss layer to generate each class loss and each regression loss by referring to the class information and the regression information and their corresponding one or more GTs, to thereby learn parameters of the FC layer by backpropagating the class loss and the regression loss.

Also, the processor 120 may instruct at least one mask loss layer to generate at least one mask loss by referring to said each mask and its corresponding mask GT, to thereby adjust at least part of parameters of the mask layer and the convolutional layer by backpropagating the mask loss.

Herein, the learning device 100 in accordance with one example of the present disclosure may be a computing device, and may be any digital device with a processor capable of computation. For reference, although FIG. 1 shows the single learning device 100, the scope of the present disclosure is not limited thereto. For example, the learning device 100 may be configured as several devices to perform its functions.

A learning method for detecting the pseudo-3D bounding box based on the CNN using the instance segmentation by using the learning device 100 in accordance with one example embodiment of the present disclosure is described by referring to FIG. 2 as follows.

First, the learning device 100 may acquire the input feature map and the 2D bounding box, where the input feature map is generated from the convolution operations on the training image, and where the 2D bounding box includes the object on the training image.

Herein, the learning device 100 may acquire or support another device to acquire information on the input feature map and the 2D bounding box from the database, or from the object detector 10 based on the CNN by inputting the training image into the object detector.

Then, processes of acquiring the input feature map and the 2D bounding box from the object detector 10 are described briefly as follows.

Herein, a term 'preceding' is used for layers, inputs, and outputs in the object detector 10, which may be placed at an input end right before of the learning device 100 as the most important device of the present disclosure, to avoid possible confusion with those in the learning device 100.

Below, operations of each layer in the object detector 10 are described as controlled by the object detector 10, but may be controlled by the learning device 100, as the case may be.

After the object detector 10 acquires the training image from the database, the object detector 10 may instruct at least one preceding convolutional layer 11, which has been learned, to apply one or more convolution operations to the training image, to thereby generate at least one preceding feature map. Then, the object detector 10 may instruct at least one preceding RPN 12 to generate each preceding proposal box corresponding to the object in the training image from the preceding feature map, and may instruct at least one preceding pooling layer 13 to apply a pooling operation to each region on the preceding feature map corresponding to said each preceding proposal box, to thereby generate at least one preceding pooled feature map. Thereafter, the object detector 10 may instruct at least one preceding FC layer 14, which has been learned, to apply a neural network operation to the preceding pooled feature map, to thereby generate preceding object pattern information corresponding to the object. Herein, the preceding object pattern information, which corresponds to features, may include information on estimated object classes among the object classes to be detected and estimated location information on bounding boxes. Then, the object detector 10 may instruct at least one preceding classification layer 15 to generate preceding class information on the object, e.g., probability information for each class to be detected, by referring to the preceding object pattern information, and may instruct at least one preceding regression layer 16 to generate preceding regression information corresponding to the object by referring to the preceding object pattern information. Herein, the 2D bounding box may be generated by referring to the preceding proposal boxes and the preceding regression information. As a result, the learning device 100 may acquire the input feature map and the 2D bounding box of the objects on the training image, by using the preceding feature map generated from the preceding convolutional layer 11 of the object detector 10 based on the CNN, and preceding regression information generated from the preceding regression layer 16.

Next, if the input feature map and the 2D bounding box are acquired, the learning device 100 may instruct the pooling layer 121 to apply the pooling operation to at least one region, corresponding to the 2D bounding box, on the input feature map, to thereby generate the pooled feature map, and may instruct an FC layer 122 to apply the neural network operation to the pooled feature map, to thereby generate the box pattern information corresponding to the pseudo-3D bounding box. Herein, the box pattern information, which corresponds to features, may include information on estimated orientation classes, among orientation classes to be detected, and estimated location information on the pseudo-3D bounding box.

Next, the learning device 100 may instruct a classification layer 123 to generate the class information corresponding to the orientation of the object by referring to the box pattern information generated from the FC layer 122. As one example, the learning device 100 may instruct the classification layer 123 to generate probability information on each of the orientation classes to be detected by referring to the box pattern information, and may determine a class with the highest probability as the orientation class of the object.

Figure 3:
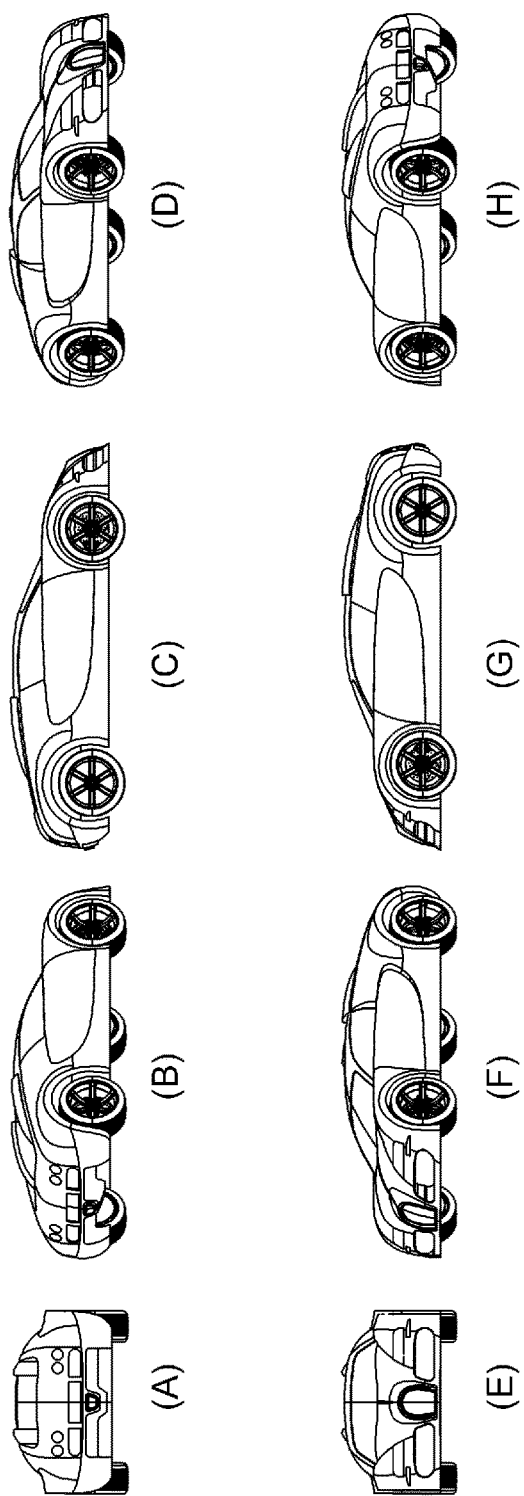
FIG. 3 is a drawing schematically illustrating classes of object orientation in the learning method for detecting the pseudo-3D bounding box based on the CNN using the instance segmentation in accordance with one example embodiment of the present disclosure.

Herein, by referring to FIG. 3, the orientation classes may be used for determining the orientation of the object. In case of vehicles, each of the orientation classes may represent a rear face in case of (A), a rear face to the right in case of (B), a right face in case of (C), a front face to the right in case of (D), a front face in case of (E), a front face to the left in case of (F), a left face in case of (G), and a rear face to the left in case of (H) of the vehicle.

Next, the learning device 100 may instruct the regression layer 124 to generate the regression information for the coordinates of the pseudo-3D bounding box corresponding to the coordinates of the 2D bounding box by referring to the box pattern information generated from the FC layer 122.

That is, the learning device 100 may instruct the regression layer to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes. Herein, each of at least one vertex of each of the instance bounding boxes may correspond to each vertex of the 2D bounding box diagonally.

Figure 4:
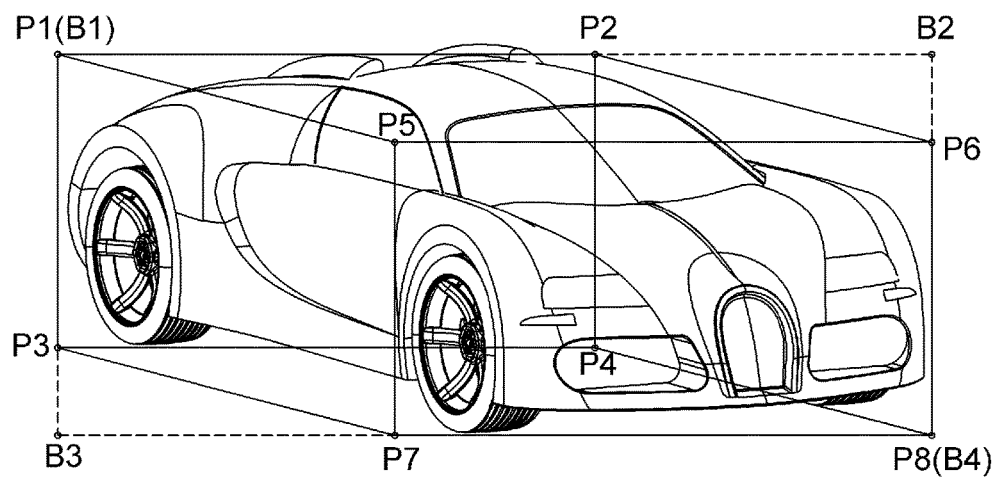
FIG. 4 is a drawing schematically illustrating a process of generating location information on the pseudo-3D bounding box in the learning method for detecting the pseudo-3D bounding box based on the CNN using the instance segmentation in accordance with one example embodiment of the present disclosure.

As one example, by referring to FIG. 4, the regression information is generated, which may include each displacement between (i) vertices P1, P2, P3, and P4 of one instance bounding box corresponding to one of a front face and a rear face of the object and (ii) vertices B1, B2, B3, and B4 of the 2D bounding box, and each displacement between (i) vertices P5, P6, P7, and P8 of another instance bounding box corresponding to the other one of the front face and the rear face and (ii) the vertices B1, B2, B3, and B4. Herein, the vertex P1 of said one instance bounding box may match the vertex B1 of the 2D bounding box, and the vertex P5 of said another instance bounding box may match the vertex B4 of the 2D bounding box. Further, determination of the front face and the rear face of the object may be performed by using the class information from the classification layer 123.

Also, the regression information may include each displacement between the vertices P1 and P5 at the top-left and each displacement between the vertices P4 and P8 at the bottom-right in said one instance bounding box and said another instance bounding box, and in this case, the vertex at the top-left P1 of said one instance bounding box may match the vertex at the top-left B1 of the 2D bounding box, the vertex at the bottom-right P8 of said another instance bounding box may match the vertex at the bottom-right B4 of the 2D bounding box, therefore, the regression information may include a displacement between the vertices B4 and the P4, and a displacement between the vertices B1 and the P5. On the other hand, as another example, the regression information may include each displacement from the vertices P1, P2, P3, and P4 of said one instance bounding box and the vertices P5, P6, P7, and P8 of said another instance bounding box.

Figure 5:
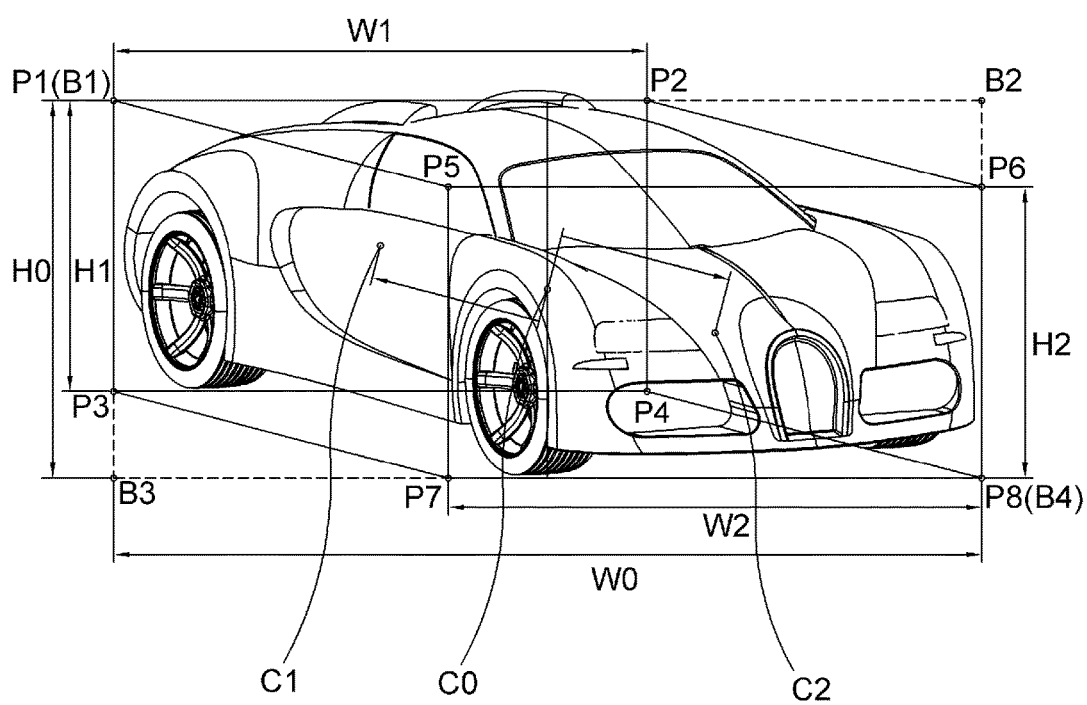
FIG. 5 is a drawing schematically illustrating another process of generating the location information on the pseudo-3D bounding box in the learning method for detecting the pseudo-3D bounding box based on the CNN using the instance segmentation in accordance with one example embodiment of the present disclosure.

As another example, by referring to FIG. 5, the regression information may include (i) a displacement between a center C1 of the vertices P1, P2, P3, and P4 of said one instance bounding box corresponding to one among the front face and the rear face of the object, and a center C0 of the vertices B1, B2, B3, and B4 of the 2D bounding box, and (ii) a displacement between a center C2 of the vertices P5, P6, P7, and P8 of said another instance bounding box corresponding to the other one among the front face and the rear face and the center C0, and (iii) respective displacements from a width W1 and a height H1 of said one instance bounding box to a width W0 and a height H0 of the 2D bounding box, and respective displacements from a width W2 and a height H2 of said another instance bounding box to the width W0 and the height H0 of the 2D bounding box. Then, coordinates of each vertex of said one instance bounding box and said another instance bounding box may be determined by referring to the regression information.

Meanwhile, supposing that each of diagonal vertices, e.g., B1 and B4, of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box, the learning device 100 may (i) connect vertices of the first and the second instance bounding boxes, which are located on a first pair of two adjacent lines of the 2D bounding box, and connect vertices of the first and the second instance bounding boxes, which are located on a second pair of other two adjacent lines of the 2D bounding box, wherein the two adjacent lines in each of the first and the second pairs do not meet at any of said each of diagonal vertices, and (ii) connect the first vertex and a vertex of the second instance bounding box which is not located on any line of the 2D bounding box, connect the second vertex and a vertex of the first instance bounding box which is not located on any line of the 2D bounding box, and then generate the pseudo-3D bounding box by referring to the class information.

That is, as in FIG. 4 or 5, the vertex P2 of said one instance bounding box and the vertex P6 of said another instance bounding box which are on a line from the vertex B1 to the vertex B4 by way of the vertex B2 may be connected, and the vertex P3 of said one instance bounding box and the vertex P7 of said another instance bounding box which are on a line from the vertex B1 to the vertex B4 by way of the vertex B3 may be connected. Then, the vertex P1 of said one instance bounding box may be connected with the vertex P5 of said another instance bounding box, and, the vertex P4 may be connected with the vertex P8. As a result, the learning device 100 may generate the pseudo-3D bounding box in a form of a cube, and the pseudo-3D bounding box may include a surface formed by the vertices P1, P2, P4, and P3, a surface formed by the vertices P5, P6, P8, and P7, a surface formed by the vertices P1, P5, P7, and P3, a surface formed by the vertices P2, P6, P8, and P4, a surface formed by the vertices P1, P2, P6, and P5, and a surface formed by the vertices P3, P4, P8, and P7.

Then, the learning device 100 may instruct a convolutional layer 125 to apply the convolution operations to each region, on the pooled feature map, corresponding to each surface of the pseudo-3D bounding box by referring to the regression information, to thereby generate the instance feature maps, and may instruct a mask layer 126 to generate each mask corresponding to said each surface by referring to the instance feature maps and the class information.

Herein, said each mask may be a binary mask which distinguishes between at least one pixel where the object is determined as located and at least one pixel where the object is determined as not located, on each of the instance feature maps. Further, the mask layer 126 may include at least part of an FCN (Fully Convolution Network).

Thereafter, the learning device 100 may instruct FC loss layers 127-1 and 127-2 to generate each class loss and each regression loss by referring to the class information and the regression information and their corresponding one or more GTs, i.e., ground truths for the orientation class and for the pseudo-3D bounding box, to thereby learn parameters of the FC layer 122 by backpropagating the class loss and the regression loss.

Also, the learning device 100 may instruct at least one mask loss layer 127-3 to generate at least one mask loss by referring to said each mask and its corresponding mask GT, to thereby adjust at least part of parameters of the mask layer 126 and the convolutional layer 125 by backpropagating the mask loss.

For reference, in the description below, the phrase "for training" is added for terms related to the learning processes, and the phrase "for testing" is added for terms related to testing processes, to avoid possible confusion.

Figure 6:
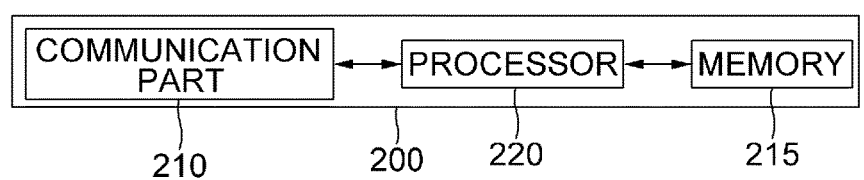
FIG. 6 is a drawing schematically illustrating a testing device for detecting the pseudo-3D bounding box based on the CNN using an instance segmentation in accordance with one example embodiment of the present disclosure.

FIG. 6 is a drawing schematically illustrating a testing device for detecting the pseudo-3D bounding box based on the CNN using the instance segmentation in accordance with one example embodiment of the present disclosure, and by referring to FIG. 6, the testing device 200 may include a communication part 210 and a processor 220. In addition, the testing device may further include a memory 215 capable of storing computer readable instructions for performing following processes. As one example, the processor, the memory, a medium, etc. may be integrated with an integrated processor.

Figure 2:
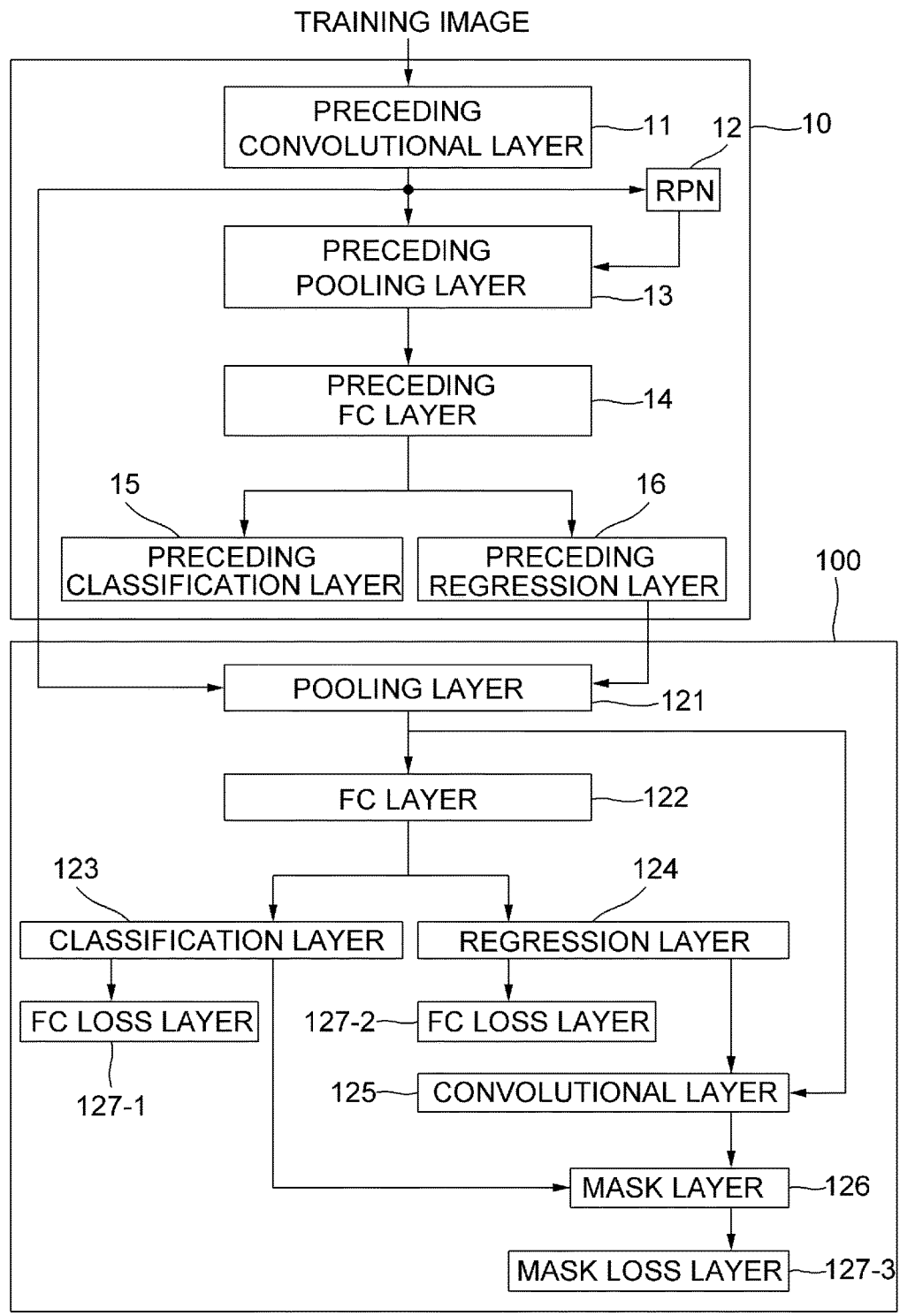
FIG. 2 is a drawing schematically illustrating a learning method for detecting the pseudo-3D bounding box based on the CNN using the instance segmentation in accordance with one example embodiment of the present disclosure.

First, the communication part 210 may acquire or support another device to acquire at least one input feature map for testing, generated by the convolution operations on at least one test image, and at least one 2D bounding box for testing of at least one object for testing on the test image, on condition that the learning device as shown in FIGS. 1 and 2 (a) if at least one input feature map for training and at least one 2D bounding box for training are acquired, where the input feature map for training is generated from the convolution operations on the training image, and where the 2D bounding box for training includes at least one object for training on the training image, (i) has instructed the pooling layer to apply the pooling operation to at least one region, corresponding to the 2D bounding box for training, on the input feature map for training, to thereby generate a pooled feature map for training, and (ii) has instructed the FC layer to apply the neural network operation to the pooled feature map for training, to thereby generate box pattern information for training corresponding to the pseudo-3D bounding box; (b) (i) has instructed the classification layer to generate class information for training corresponding to an orientation of the object for training by referring to the box pattern information for training, (ii) has instructed the regression layer to generate regression information for training on coordinates of the pseudo-3D bounding box corresponding to coordinates of the 2D bounding box for training by referring to the box pattern information for training, and (iii) has instructed the convolutional layer to apply the convolution operations to each region corresponding to each surface, generated by referring to the regression information for training, of the pseudo-3D bounding box on the pooled feature map for training, to thereby generate one or more instance feature maps for training, and has instructed the mask layer to generate each mask for training corresponding to said each surface by referring to the instance feature maps for training and the class information for training; and (c) has instructed the FC loss layer to generate each class loss and each regression loss by referring to the class information for training and the regression information for training and their corresponding one or more GTs, to thereby learn parameters of the FC layer by backpropagating the class loss and the regression loss. Herein, the communication part 210 may acquire the input feature map for testing and at least one 2D bounding box for testing, where the input feature map for testing is generated from the convolution operations on the test image, and where the 2D bounding box for testing includes at least one object for testing on the test image from the object detector.

Next, the processor 220 may perform or support another device to perform (a) a first process of (i) instructing the pooling layer to apply the pooling operation to at least one region, corresponding to the 2D bounding box for testing, on the input feature map for testing, to thereby generate a pooled feature map for testing, and (ii) instructing the FC layer to apply the neural network operation to the pooled feature map for testing, to thereby generate box pattern information for testing corresponding to the pseudo-3D bounding box; (b) a second process of (i) instructing the classification layer to generate class information for testing corresponding to an orientation of at least one object for testing by referring to the box pattern information for testing, (ii) instructing the regression layer to generate regression information for testing on coordinates of the pseudo-3D bounding box corresponding to coordinates of the 2D bounding box for testing by referring to the box pattern information for testing, and (iii) instructing the convolutional layer to apply the convolution operations to each region corresponding to each surface, generated by referring to the regression information for testing, of the pseudo-3D bounding box on the pooled feature map for testing, to thereby generate one or more instance feature maps for testing, and instructing the mask layer to generate each mask for testing corresponding to said each surface by referring to the instance feature maps for testing and the class information for testing.

Herein, the testing device 200 in accordance with another example embodiment of the present disclosure may be a computing device, and may be any device with a processor capable of computation. For reference, although FIG. 6 shows the single testing device 200, the scope of the present disclosure is not limited thereto. For example, the testing device may be configured as several devices to perform its functions.

Figure 7:
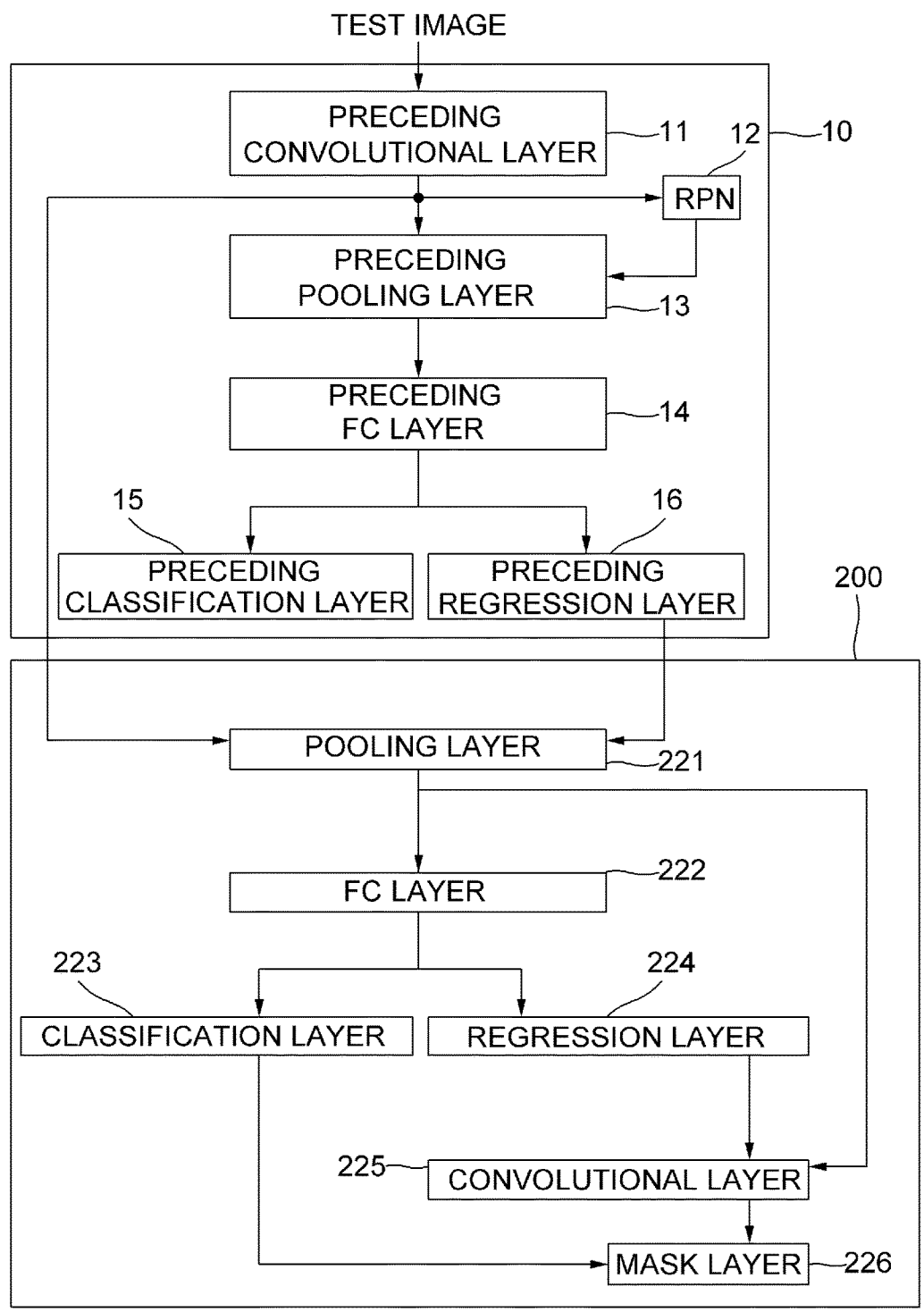
FIG. 7 is a drawing schematically illustrating a testing method for detecting the pseudo-3D bounding box based on the CNN using an instance segmentation in accordance with one example embodiment of the present disclosure.

A testing method for detecting the pseudo-3D bounding box based on the CNN using the instance segmentation by using the testing device 200 in accordance with another example embodiment of the present disclosure is described by referring to FIG. 7 as follows. In the description below, the part easily deducible from the learning method described by referring to FIGS. 2 to 5 will be omitted.

First, on condition that at least part of parameters of an FC layer 222, a convolutional layer 225 and a mask layer 226 has been learned by the learning method described by referring to FIGS. 2 to 5, if the test image is inputted into the object detector 10 based on the CNN, the testing device 200 may acquire or support another device to acquire the input feature map for testing and the 2D bounding box for testing from the object detector 10.

That is, the object detector 10 may instruct the preceding convolutional layer 11 to apply the convolution operations to the test image, to thereby generate at least one preceding feature map for testing. Then, the object detector 10 may instruct the preceding RPN 12 to generate each preceding proposal box for testing corresponding to the object for testing in the test image from the preceding feature map for testing, and may instruct the preceding pooling layer 13 to apply the pooling operation to each region on the preceding feature map for testing corresponding to said each preceding proposal box for testing, to thereby generate at least one preceding pooled feature map for testing. Thereafter, the object detector 10 may instruct the preceding FC layer 14 to apply the neural network operation to the preceding pooled feature map for testing, to thereby generate preceding object pattern information for testing corresponding to the object for testing. Then, the object detector 10 may instruct the preceding classification layer 15 to generate preceding class information for testing on the object for testing by referring to the preceding object pattern information for testing, and may instruct the preceding regression layer 16 to generate preceding regression information for testing corresponding to the object for testing by referring to the preceding object pattern information for testing. As a result, the testing device 200 may acquire or support another device to acquire the input feature map for testing and the 2D bounding box for testing of the objects for testing on the test image, by using the preceding feature map for testing generated from the preceding convolutional layer 11 of the object detector 10 based on the CNN, and preceding regression information for testing generated from the preceding regression layer 16.

Next, if the input feature map for testing and the 2D bounding box for testing are acquired, where the input feature map for testing is generated from the convolution operations on the test image, and where the 2D bounding box for testing includes the object for testing on the test image, the testing device 200 may instruct a pooling layer 221 to apply the pooling operation to at least one region, corresponding to the 2D bounding box for testing, on the input feature map for testing, to thereby generate the pooled feature map for testing, and may instruct the FC layer 222 to apply the neural network operation to the pooled feature map for testing, to thereby generate the box pattern information for testing corresponding to the pseudo-3D bounding box.

Next, the testing device 200 may instruct a classification layer 223 to generate the class information for testing corresponding to the orientation of the object for testing by referring to the box pattern information for testing generated from the FC layer 222.

Next, the testing device 200 may instruct a regression layer 224 to generate the regression information for testing for the coordinates of the pseudo-3D bounding box corresponding to the coordinates of the 2D bounding box for testing, by referring to the box pattern information for testing generated from the FC layer 222.

Then, the testing device 200 may instruct the convolutional layer 225 to apply the convolution operations to each region, on the pooled feature map for testing, corresponding to each surface of the pseudo-3D bounding box by referring to the regression information for testing, to thereby generate the instance feature maps for testing, and may instruct the mask layer 226 to generate each mask for testing corresponding to said each surface by referring to the instance feature maps for testing and class information for testing.

Figure 8:
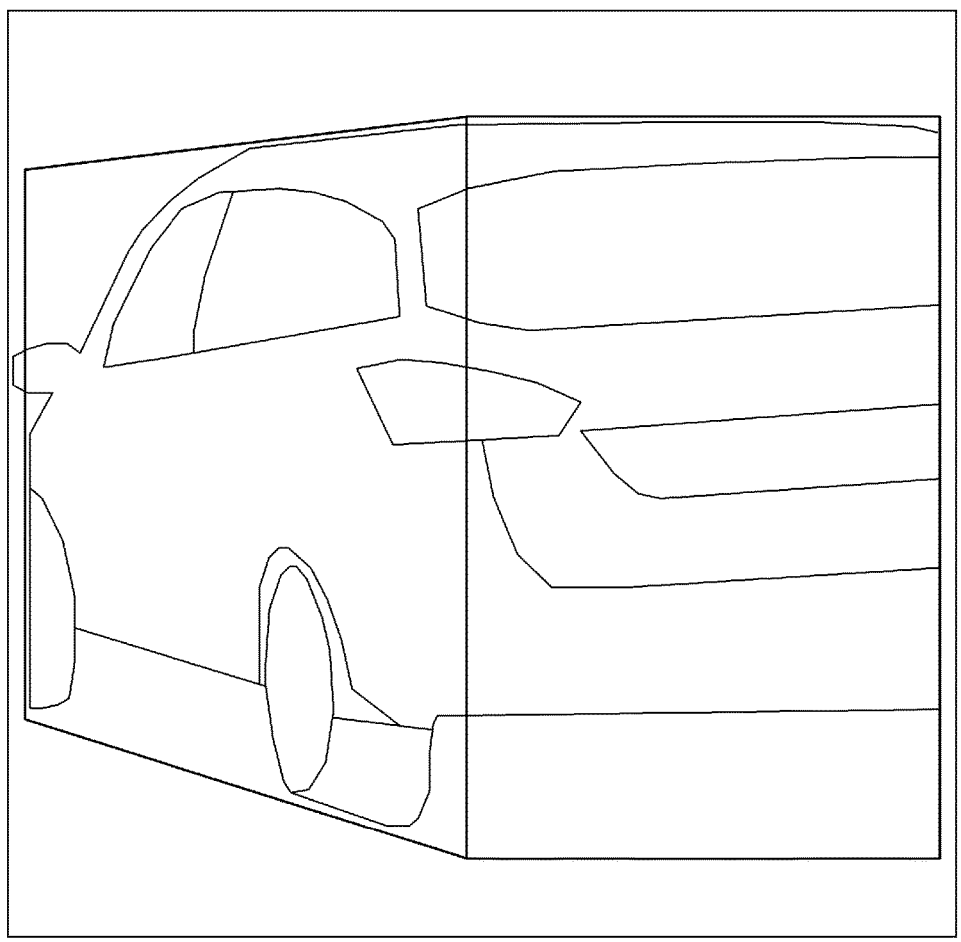
FIG. 8 is a drawing schematically illustrating the pseudo-3D bounding box generated by the testing method for detecting the pseudo-3D bounding box based on the CNN using an instance segmentation in accordance with one example embodiment of the present disclosure.

Then, as can be seen in FIG. 8, the testing device 200 may generate or support another device to generate the pseudo-3D bounding box in which the instance segmentation is performed on each surface of the object for testing by using the regression information for testing and said each mask for testing, of the object for testing in the 2D bounding box for testing.

The present disclosure has an effect of generating the 3D bounding box of the object without complex computation required for creation of 3D coordinates and improving the accuracy of detection.

The present disclosure has another effect of simplifying a 3D bounding box for circumscribing a 3D object by using the pseudo-3D bounding box.

The present disclosure has still another effect of reducing computational time and resources by using 2D coordinates of vertices for location of the pseudo-3D bounding box.

The CNN may be capable of converting modes according to poses of the detected objects, to be used for realistic rendering in virtual driving or the like. Further, the pseudo-3D bounding box may be obtained through a lidar or a rader, and the surface may be segmented by using a camera, so that shade information of each of surfaces of the pseudo-3D bounding box can be reflected on the learning.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting at least one pseudo-3D bounding box based on a CNN using an instance segmentation, comprising steps of:
    (a) a learning device, if at least one input feature map and at least one 2D bounding box are acquired, wherein the input feature map is generated from one or more convolution operations on at least one training image, and wherein the 2D bounding box includes at least one object on the training image, instructing a pooling layer to apply a pooling operation to at least one region, corresponding to the 2D bounding box, on the input feature map, to thereby generate a pooled feature map, and instructing an FC layer to apply at least one neural network operation to the pooled feature map, to thereby generate box pattern information corresponding to the pseudo-3D bounding box;
    (b) the learning device (i) instructing a classification layer to generate class information corresponding to an orientation of the object by referring to the box pattern information, (ii) instructing a regression layer to generate regression information on coordinates of the pseudo-3D bounding box corresponding to coordinates of the 2D bounding box by referring to the box pattern information, and (iii) instructing a convolutional layer to apply convolution operations to each region corresponding to each surface, generated by referring to the regression information, of the pseudo-3D bounding box on the pooled feature map, to thereby generate one or more instance feature maps, and instructing a mask layer to generate each mask corresponding to said each surface by referring to the instance feature maps and the class information; and
    (c) the learning device instructing at least one FC loss layer to generate each class loss and each regression loss by referring to the class information and the regression information and their corresponding one or more GTs, to thereby learn parameters of the FC layer by backpropagating the class loss and the regression loss.

2. The method of claim 1, wherein, after the step of (b), the learning device instructs at least one mask loss layer to generate at least one mask loss by referring to said each mask and its corresponding mask GT, to thereby adjust at least part of parameters of the mask layer and the convolutional layer by backpropagating the mask loss.

3. The method of claim 1, wherein the mask layer includes at least part of a fully convolution network.

4. The method of claim 1, wherein the mask is a binary mask which distinguishes between at least one pixel where the object is determined as located and at least one pixel where the object is determined as not located, on each of the instance feature maps.

5. The method of claim 1, wherein, at the step of (b), the learning device instructs the regression layer to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

6. The method of claim 5, wherein, supposing that each of diagonal vertices of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box,
    the learning device (i) connects vertices of the first and the second instance bounding boxes, which are located on a first pair of two adjacent lines of the 2D bounding box, and connects vertices of the first and the second instance bounding boxes, which are located on a second pair of other two adjacent lines of the 2D bounding box, wherein the two adjacent lines in each of the first and the second pairs do not meet at any of said each of diagonal vertices and (ii) connects the first vertex and a vertex of the second instance bounding box which is not located on any line of the 2D bounding box, connects the second vertex and a vertex of the first instance bounding box which is not located on any line of the 2D bounding box, and then generates the pseudo-3D bounding box by referring to the class information.

7. The method of claim 1, wherein the learning device acquires the input feature map and the 2D bounding box from an object detector based on a CNN.

8. The method of claim 7, wherein, the object detector instructs at least one preceding convolutional layer to generate at least one preceding feature map by the convolution operations on the training image, instructing at least one preceding RPN to generate at least one preceding proposal box corresponding to at least one object for training in the training image, from the preceding feature map, instructing at least one preceding pooling layer to apply the pooling operation to at least one region, corresponding to the preceding proposal box, on the preceding feature map, to thereby generate at least one preceding pooled feature map, instructing at least one preceding FC layer to apply at least one neural network operation to the preceding pooled feature map, to thereby generate preceding object pattern information corresponding to the object for training, instructing at least one preceding classification layer to generate preceding class information of the object for training by referring to the preceding object pattern information, and instructing at least one preceding regression layer to generate preceding regression information on the 2D bounding box corresponding to the object for training by referring to the preceding object pattern information, to thereby generate the input feature map and the 2D bounding box.

9. A testing method for detecting at least one pseudo-3D bounding box based on a CNN using an instance segmentation, comprising steps of:
(a) a testing device, on condition that a learning device (i) has acquired at least one input feature map for training and at least one 2D bounding box for training, wherein the input feature map for training is generated from one or more convolution operations on at least one training image, and wherein the 2D bounding box for training includes at least one object for training in the training image, (ii) has instructed at least one pooling layer to apply at least one pooling operation to at least one region, corresponding to the 2D bounding box for training, on the input feature map for training, to thereby generate at least one pooled feature map for training, (iii) has instructed at least one FC layer to apply at least one neural network operation to the pooled feature map for training, to thereby generate box pattern information for training corresponding to the pseudo-3D bounding box, (iv) has instructed at least one classification layer to generate class information for training corresponding to an orientation of the object for training by referring to the box pattern information for training, (v) has instructed at least one regression layer to generate regression information for training on coordinates of the pseudo-3D bounding box corresponding to coordinates of the 2D bounding box for training by referring to the box pattern information for training, (vi) has instructed at least one convolutional layer to apply the convolution operations to each region corresponding to each surface, generated by referring to the regression information for training, of the pseudo-3D bounding box on the pooled feature map for training, to thereby generate one or more instance feature maps for training, (vii) has instructed at least one mask layer to generate each mask for training corresponding to said each surface by referring to the instance feature maps for training and the class information for training, and (viii) has instructed at least one FC loss layer to generate each class loss and each regression loss by referring to the class information for training and the regression information for training and their corresponding one or more GTs, to thereby learn parameters of the FC layer by backpropagating the class loss and the regression loss, instructing the pooling layer to apply the pooling operation to at least one region corresponding to at least one 2D bounding box for testing on at least one input feature map for testing, to thereby generate at least one pooled feature map for testing, and instructing the FC layer to apply the neural network operation to the pooled feature map for testing, to thereby generate box pattern information for testing corresponding to the pseudo-3D bounding box; and
(b) the testing device (i) instructing the classification layer to generate class information for testing corresponding to an orientation of at least one object for testing by referring to the box pattern information for testing, (ii) instructing the regression layer to generate regression information for testing on coordinates of the pseudo-3D bounding box corresponding to coordinates of the 2D bounding box for testing by referring to the box pattern information for testing, and (iii) instructing the convolutional layer to apply the convolution operations to each region corresponding to each surface, generated by referring to the regression information for testing, of the pseudo-3D bounding box on the pooled feature map for testing, to thereby generate one or more instance feature maps for testing, and instructing the mask layer to generate each mask for testing corresponding to said each surface by referring to the instance feature maps for testing and the class information for testing.

10. The testing method of claim 9, wherein, after the process of (vii), the learning device has instructed at least one mask loss layer to generate at least one mask loss by referring to said each mask for training and its corresponding mask GT, to thereby adjust at least part of parameters of the mask layer and the convolutional layer by backpropagating the mask loss.

11. The testing method of claim 9, wherein said each mask for testing is a binary mask which distinguishes between at least one pixel where the object for testing is determined as located and at least one pixel where the object for testing is determined as not located, on each of the instance feature maps for testing.

12. The testing method of claim 9, wherein, at the step of (b), the testing device instructs the regression layer to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

13. The testing method of claim 12, wherein, supposing that each of diagonal vertices of the 2D bounding box for testing is a first vertex and a second vertex, that an instance bounding box for testing whose at least one vertex matches the first vertex among the instance bounding boxes for testing is a first instance bounding box for testing, and that an instance bounding box for testing whose at least one vertex matches the second vertex among the instance bounding boxes for testing is a second instance bounding box for testing,
the testing device (i) connects vertices of the first and the second instance bounding boxes for testing, which are located on a first pair of two adjacent lines of the 2D bounding box for testing, and connects vertices of the first and the second instance bounding boxes for testing, which are located on a second pair of other two adjacent lines of the 2D bounding box for testing, wherein the two adjacent lines in each of the first and the second pairs do not meet at any of said each of diagonal vertices and (ii) connects the first vertex and a vertex of the second instance bounding box for testing which is not located on any line of the 2D bounding box for testing, connects the second vertex and a vertex of the first instance bounding box for testing which is not located on any line of the 2D bounding box for testing, and then generates the pseudo-3D bounding box by referring to the class information.

14. The testing method of claim 9, wherein the testing device acquires the input feature map for testing and the 2D bounding box for testing from an object detector based on a CNN.

15. The testing method of claim 14, wherein, the object detector instructs at least one preceding convolutional layer to generate at least one preceding feature map for testing by the convolution operations on the test image, instructs at least one preceding RPN to generate at least one preceding proposal box for testing corresponding to the object for testing in the test image, from the preceding feature map for testing, instructs at least one preceding pooling layer to apply the pooling operation to at least one region, corresponding to the preceding proposal box for testing, on the preceding feature map for testing, to thereby generate at least one preceding pooled feature map for testing, instructs at least one preceding FC layer to apply the neural network operation to the preceding pooled feature map for testing, to thereby generate preceding object pattern information for testing corresponding to the object for testing, instructs at least one preceding classification layer to generate preceding class information for testing of the object for testing by referring to the preceding object pattern information for testing, and instructs at least one preceding regression layer to generate preceding regression information for testing on the 2D bounding box for testing corresponding to the object for testing by referring to the preceding object pattern information for testing, to thereby generate the input feature map for testing and the 2D bounding box for testing.

16. A learning device for detecting at least one pseudo-3D bounding box based on a CNN using an instance segmentation, comprising:
  at least one memory that stores instructions; and
  at least one processor configured to execute the instructions to: perform processes of (I) instructing a pooling layer to apply a pooling operation to at least one region, corresponding to at least one 2D bounding box, on at least one input feature map, to thereby generate a pooled feature map, wherein the input feature map is generated from one or more convolution operations on at least one training image, and wherein the 2D bounding box includes at least one object on the training image, and instructing an FC layer to apply at least one neural network operation to the pooled feature map, to thereby generate box pattern information corresponding to the pseudo-3D bounding box, (II) (II-1) instructing a classification layer to generate class information corresponding to an orientation of the object by referring to the box pattern information, (II-2) instructing a regression layer to generate regression information on coordinates of the pseudo-3D bounding box corresponding to coordinates of the 2D bounding box by referring to the box pattern information, and (II-3) instructing a convolutional layer to apply convolution operations to each region corresponding to each surface, generated by referring to the regression information, of the pseudo-3D bounding box on the pooled feature map, to thereby generate one or more instance feature maps, and instructing a mask layer to generate each mask corresponding to said each surface by referring to the instance feature maps and the class information; and (III) instructing at least one FC loss layer to generate each class loss and each regression loss by referring to the class information and the regression information and their corresponding one or more GTs, to thereby learn parameters of the FC layer by backpropagating the class loss and the regression loss.

17. The learning device of claim 16, wherein, after the process of (II-3), the processor instructs at least one mask loss layer to generate at least one mask loss by referring to said each mask and its corresponding mask GT, to thereby adjust at least part of parameters of the mask layer and the convolutional layer by backpropagating the mask loss.

18. The learning device of claim 16, wherein the mask layer includes at least part of a fully convolution network.

19. The learning device of claim 16, wherein the mask is a binary mask which distinguishes between at least one pixel where the object is determined as located and at least one pixel where the object is determined as not located, on each of the instance feature maps.

20. The learning device of claim 16, wherein, at the process of (II-3), the processor instructs the regression layer to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

21. The learning device of claim 20, wherein, supposing that each of diagonal vertices of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box,
  the processor (i) connects vertices of the first and the second instance bounding boxes, which are located on a first pair of two adjacent lines of the 2D bounding box, and connects vertices of the first and the second instance bounding boxes, which are located on a second pair of other two adjacent lines of the 2D bounding box, wherein the two adjacent lines in each of the first and the second pairs do not meet at any of said each of diagonal vertices and (ii) connects the first vertex and a vertex of the second instance bounding box which is not located on any line of the 2D bounding box, connects the second vertex and a vertex of the first instance bounding box which is not located on any line of the 2D bounding box, and then generates the pseudo-3D bounding box by referring to the class information.

22. The learning device of claim 16, wherein the processor acquires the input feature map and the 2D bounding box from an object detector based on a CNN.

23. The learning device of claim 22, wherein, the object detector instructs at least one preceding convolutional layer to generate at least one preceding feature map by the convolution operations on the training image, instructing at least one preceding RPN to generate at least one preceding proposal box corresponding to at least one object for training in the training image, from the preceding feature map, instructing at least one preceding pooling layer to apply the pooling operation to at least one region, corresponding to the preceding proposal box, on the preceding feature map, to thereby generate at least one preceding pooled feature map, instructing at least one preceding FC layer to apply at least one neural network operation to the preceding pooled feature map, to thereby generate preceding object pattern information corresponding to the object for training, instructing at least one preceding classification layer to generate preceding class information of the object for training by referring to the preceding object pattern information, and instructing at least one preceding regression layer to generate preceding regression information on the 2D bounding box corresponding to the object for training by referring to the preceding object pattern information, to thereby generate the input feature map and the 2D bounding box.

24. A testing device for detecting at least one pseudo-3D bounding box based on a CNN using an instance segmentation, comprising:
at least one memory that stores instructions; and
at least one processor, on condition that a learning device (i) has acquired at least one input feature map for training and at least one 2D bounding box for training, wherein the input feature map for training is generated from one or more convolution operations on at least one training image, and wherein the 2D bounding box for training includes at least one object for training in the training image, (ii) has instructed at least one pooling layer to apply at least one pooling operation to at least one region, corresponding to the 2D bounding box for training, on the input feature map for training, to thereby generate at least one pooled feature map for training, (iii) has instructed at least one FC layer to apply at least one neural network operation to the pooled feature map for training, to thereby generate box pattern information for training corresponding to the pseudo-3D bounding box, (iv) has instructed at least one classification layer to generate class information for training corresponding to an orientation of the object for training by referring to the box pattern information for training, (v) has instructed at least one regression layer to generate regression information for training on coordinates of the pseudo-3D bounding box corresponding to coordinates of the 2D bounding box for training by referring to the box pattern information for training, (vi) has instructed at least one convolutional layer to apply the convolution operations to each region corresponding to each surface, generated by referring to the regression information for training, of the pseudo-3D bounding box on the pooled feature map for training, to thereby generate one or more instance feature maps for training, (vii) has instructed at least one mask layer to generate each mask for training corresponding to said each surface by referring to the instance feature maps for training and the class information for training, and (viii) has instructed at least one FC loss layer to generate each class loss and each regression loss by referring to the class information for training and the regression information for training and their corresponding one or more GTs, to thereby learn parameters of the FC layer by backpropagating the class loss and the regression loss; configured to execute the instructions to: perform processes of (I) instructing the pooling layer to apply the pooling operation to at least one region corresponding to at least one 2D bounding box for testing on at least one input feature map for testing, to thereby generate at least one pooled feature map for testing, wherein the input feature map for testing is generated from one or more convolution operations on at least one test image, and wherein the 2D bounding box for testing includes at least one object for testing on the test image, and instructing the FC layer to apply the neural network operation to the pooled feature map for testing, to thereby generate box pattern information for testing corresponding to the pseudo-3D bounding box, (II) (II-1) instructing the classification layer to generate class information for testing corresponding to an orientation of the object for testing by referring to the box pattern information for testing, (II-2) instructing the regression layer to generate regression information for testing on coordinates of the pseudo-3D bounding box corresponding to coordinates of the 2D bounding box for testing by referring to the box pattern information for testing, and (II-3) instructing the convolutional layer to apply the convolution operations to each region corresponding to each surface, generated by referring to the regression information for testing, of the pseudo-3D bounding box on the pooled feature map for testing, to thereby generate one or more instance feature maps for testing, and instructing the mask layer to generate each mask for testing corresponding to said each surface by referring to the instance feature maps for testing and the class information for testing.

25. The testing device of claim 24, wherein, after the process of (vii), the learning device has instructed at least one mask loss layer to generate at least one mask loss by referring to said each mask for training and its corresponding mask GT, to thereby adjust at least part of parameters of the mask layer and the convolutional layer by backpropagating the mask loss.

26. The testing device of claim 24, wherein said each mask for testing is a binary mask which distinguishes between at least one pixel where the object for testing is determined as located and at least one pixel where the object for testing is determined as not located, on each of the instance feature maps for testing.

27. The testing device of claim 24, wherein, at the process of (II-2), the processor instructs the regression layer to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

28. The testing device of claim 27, wherein, supposing that each of diagonal vertices of the 2D bounding box for testing is a first vertex and a second vertex, that an instance bounding box for testing whose at least one vertex matches the first vertex among the instance bounding boxes for testing is a first instance bounding box for testing, and that an instance bounding box for testing whose at least one vertex matches the second vertex among the instance bounding boxes for testing is a second instance bounding box for testing,
the processor (i) connects vertices of the first and the second instance bounding boxes for testing, which are located on a first pair of two adjacent lines of the 2D bounding box for testing, and connects vertices of the first and the second instance bounding boxes for testing, which are located on a second pair of other two adjacent lines of the 2D bounding box for testing, wherein the two adjacent lines in each of the first and the second pairs do not meet at any of said each of diagonal vertices and (ii) connects the first vertex and a vertex of the second instance bounding box for testing which is not located on any line of the 2D bounding box for testing, connects the second vertex and a vertex of the first instance bounding box for testing which is not located on any line of the 2D bounding box for testing, and then generates the pseudo-3D bounding box by referring to the class information.

29. The testing device of claim 24, wherein the processor acquires the input feature map for testing and the 2D bounding box for testing from an object detector based on a CNN.

30. The testing device of claim 29, wherein, the object detector instructs at least one preceding convolutional layer to generate at least one preceding feature map for testing by the convolution operations on the test image, instructs at least one preceding RPN to generate at least one preceding proposal box for testing corresponding to the object for testing in the test image, from the preceding feature map for testing, instructs at least one preceding pooling layer to apply the pooling operation to at least one region, corresponding to the preceding proposal box for testing, on the preceding feature map for testing, to thereby generate at least one preceding pooled feature map for testing, instructs at least one preceding FC layer to apply the neural network operation to the preceding pooled feature map for testing, to thereby generate preceding object pattern information for testing corresponding to the object for testing, instructs at least one preceding classification layer to generate preceding class information for testing of the object for testing by referring to the preceding object pattern information for testing, and instructs at least one preceding regression layer to generate preceding regression information for testing on the 2D bounding box for testing corresponding to the object for testing by referring to the preceding object pattern information for testing, to thereby generate the input feature map for testing and the 2D bounding box for testing.

* * * * *